US006178741B1

(12) United States Patent
Nelson et al.

(10) Patent No.: US 6,178,741 B1
(45) Date of Patent: Jan. 30, 2001

(54) MEMS SYNTHESIZED DIVERT PROPULSION SYSTEM

(75) Inventors: Steven D. Nelson, Redondo Beach; William J. Sipes, Canyon Country; David K. Hoffmaster, Long Beach, all of CA (US)

(73) Assignee: TRW Inc., Redondo Beach, CA (US)

(*) Notice: Under 35 U.S.C. 154(b), the term of this patent shall be extended for 0 days.

(21) Appl. No.: 09/173,923

(22) Filed: Oct. 16, 1998

(51) Int. Cl.[7] ................................................. F02K 1/00
(52) U.S. Cl. ........................ 60/229; 60/256; 244/3.22
(58) Field of Search ........................... 60/229, 224, 225, 60/244, 263, 253, 256; 244/3.22, 169

(56) References Cited

U.S. PATENT DOCUMENTS

| | | |
|---|---|---|
| 3,575,127 | 4/1971 | Wislicenus et al. . |
| 3,589,617 | 6/1971 | Adamson . |
| 3,613,500 | 10/1971 | Warin . |
| 3,659,422 | 5/1972 | Hope . |
| 3,696,999 | 10/1972 | Desjardins et al. . |
| 3,759,467 | 9/1973 | Roudil . |
| 3,806,035 | 4/1974 | Calder . |
| 3,815,357 | 6/1974 | Brennan . |
| 3,863,867 | 2/1975 | Souslin et al. . |
| 4,211,378 | 7/1980 | Crepin . |
| 4,246,978 | 1/1981 | Schulz et al. . |
| 4,519,208 | 5/1985 | Loisy et al. . |
| 4,583,362 | 4/1986 | Wagner . |
| 4,843,814 | 7/1989 | von Ingelheim . |
| 4,919,364 | 4/1990 | John et al. . |
| 4,979,697 | * 12/1990 | Kranz ................................. 244/3.22 |
| 5,022,306 | 6/1991 | Sayles . |
| 5,028,014 | * 7/1991 | Anderson, Jr. ...................... 244/3.22 |
| 5,044,156 | * 9/1991 | Deffayet ............................. 60/229 X |
| 5,045,004 | 9/1991 | Kim . |
| 5,076,511 | 12/1991 | Stein et al. . |
| 5,099,645 | 3/1992 | Schuler et al. . |
| 5,101,622 | 4/1992 | Bond . |
| 5,170,623 | 12/1992 | Dailey et al. . |
| 5,282,357 | 2/1994 | Sackheim . |
| 5,305,600 | 4/1994 | Brossier et al. . |
| 5,417,049 | 5/1995 | Sackheim et al. . |
| 5,533,331 | 7/1996 | Campbell et al. . |
| 5,572,865 | 11/1996 | Sackheim et al. . |
| 5,710,423 | 1/1998 | Biven et al. . |
| 5,779,188 | 7/1998 | Frick . |

\* cited by examiner

*Primary Examiner*—Timothy S. Thorpe
*Assistant Examiner*—David J. Torrente
(74) *Attorney, Agent, or Firm*—Michael S. Yatsko

(57) ABSTRACT

A synthesized divert propulsion system adapted to be utilized in various vehicles, including kill vehicles, interceptors, rockets, missiles and the like. The system is fabricated using microelectromechanical system (MEMS) technology which eliminates complex interconnections required for traditional divert propulsion systems by integrating all propulsion fluid functions and all controlled electronic functions onto a plurality of wafers. The wafers are integrated into a complete synthesized divert propulsion system by stacking and bonding the wafers together.

30 Claims, 9 Drawing Sheets

THRUST CONTROL BLOCK DIAGRAM

MEMS SYNTHESIZED DIVERT PROPULSION SYSTEM

BACKGROUND OF THE INVENTION

1. Field of the Invention

The present invention relates to a divert propulsion system and more particularly to a method and apparatus to forming a synthesized divert propulsion system from microelectromechanical system (MEMS) technology.

2. Description of the Prior Art

Various vehicles, including kill vehicles, interceptors, rockets and missiles are known for intercepting and destroying various airborne threats or targets, such as missiles, rockets and the like. Examples of such systems are disclosed in U.S. Pat. Nos. 4,211,378; 5,533,331 and 5,710,423. Such vehicles are known to include divert propulsion systems which are used to produce thrusts in a direction generally orthogonal to the longitudinal axis and velocity vector of the vehicle. The divert maneuvers are used to enhance the kill or intercept probability of the vehicle relative to a particular target. Both spinning and non-spinning vehicles are known. Such divert propulsion systems are under the control of a control system which receives data regarding the trajectory and distance of the target relative to the vehicle in order to determine the amount of divert propulsion to intercept the target.

Known divert propulsion systems for kill vehicles, interceptors, rockets and missiles are known to be relatively complex, large and formed from discrete, non-synthesized components and subsystems. An exemplary divert propulsion system, formed from discrete components and subsystems, is illustrated in FIGS. 1 and 2.

There are many known disadvantages associated with known divert propulsion systems as illustrated in FIGS. 1 and 2. For example, the number of components required for the system is relatively large; typically around 30. Moreover, the systems are relatively complex and are known to include pressurization subsystems and components, propellant storage and feed subsystems and components, as well as a control and a divert thruster subsystem. Assembly of the components into a functional system requires relatively complex designs with structural, thermal, mechanical and electrical interconnections for attachment for heat, fluid and electric conduction. Interconnecting tubing and cabling is also known to be relatively complex requiring many joints, fittings, connectors, tie-downs and the like.

Such known divert propulsion systems are also known to have various design constraints. For example, such systems result in additional designs and fabrication complexity due to the interaction of the propulsion components and subsystems with other vehicle components and subsystems, such as seekers, IMUs, electronics, cabling, actuators and the like. Thus, there is a need for a simplified divert propulsion system which is less complex than known divert propulsion systems.

SUMMARY OF THE INVENTION

Briefly, the present invention relates to a synthesized divert propulsion system adapted to be utilized in various vehicles, including kill vehicles, interceptors, rockets, missiles and the like. The system is amenable to being fabricated using microelectromechanical system (MEMS) technology which eliminates complex interconnections required for traditional divert propulsion systems by integrating all propulsion fluid functions and all controlled electronic functions onto a plurality of wafers. The wafers are integrated into a complete synthesized divert propulsion system by stacking and bonding the wafers together.

DESCRIPTION OF THE DRAWINGS

These and other advantages of the present invention will be understood by reference to the following specification and attached drawings wherein.

DETAILED DESCRIPTION

The synthesized divert propulsion system in accordance with the present invention offers many advantages over known divert propulsion systems. For example, the synthesized divert propulsion system in accordance with the present invention eliminates the relatively complex interconnections required in traditional divert propulsion systems by integrating all propulsion fluid functions and all control of electronic functions into wafers. These wafers are then integrated into complete synthesized functional divert propulsion system by stacking and bonding the wafers together. An important aspect of the invention is that the wafers are amenable to being formed by known microelectromechanical system (MEMS) fabrication technology. Since MEMS fabrication technology is inherently an electronic based planar method of design, the propulsion components can be fabricated as wafers and joined together by various methods including anodic and polymeric bonding. The use of mechanical fasteners and connectors is thus eliminated.

Figure 1:
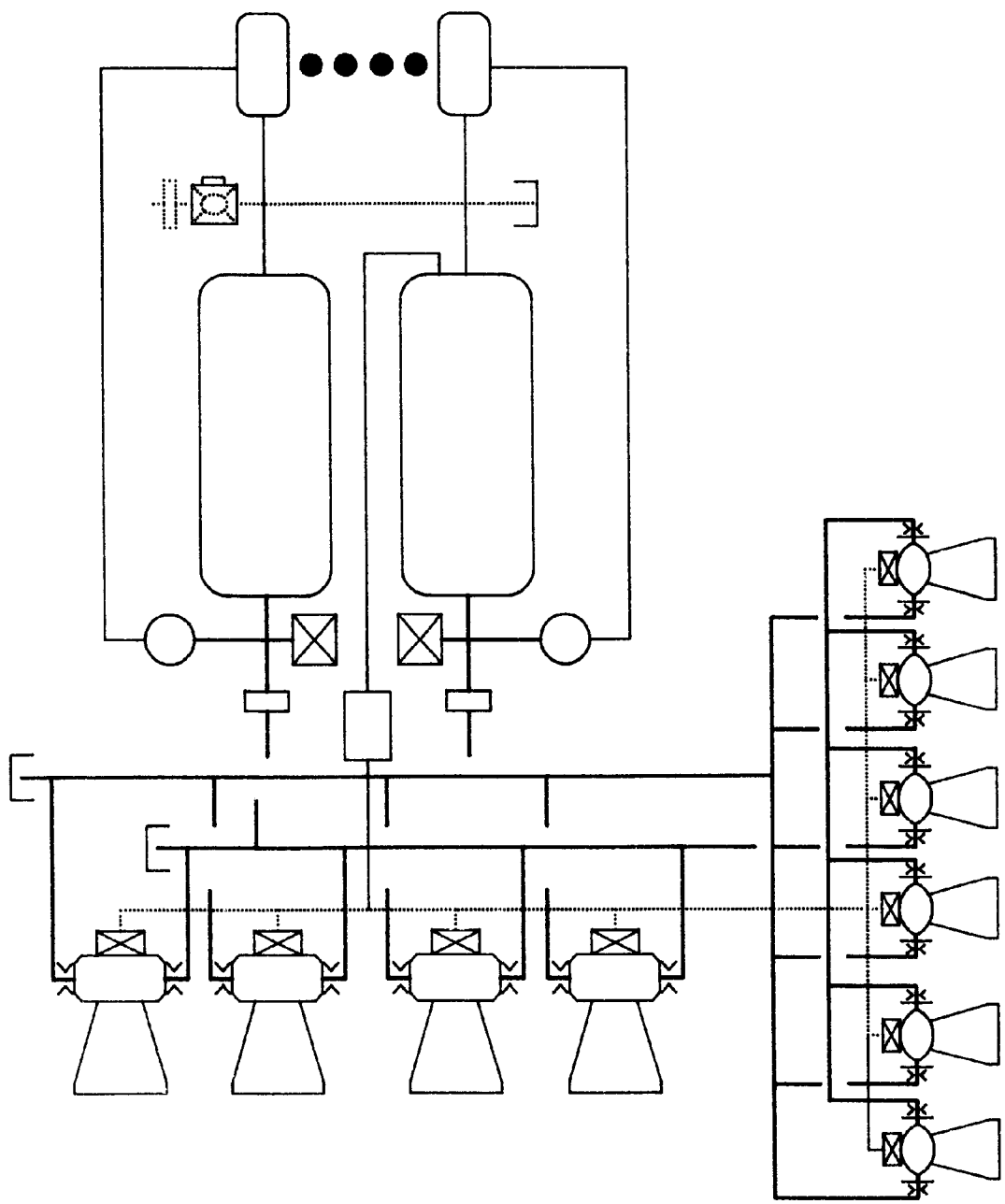
FIG. 1 is a schematic diagram of a known divert propulsion system.
Figure 2:
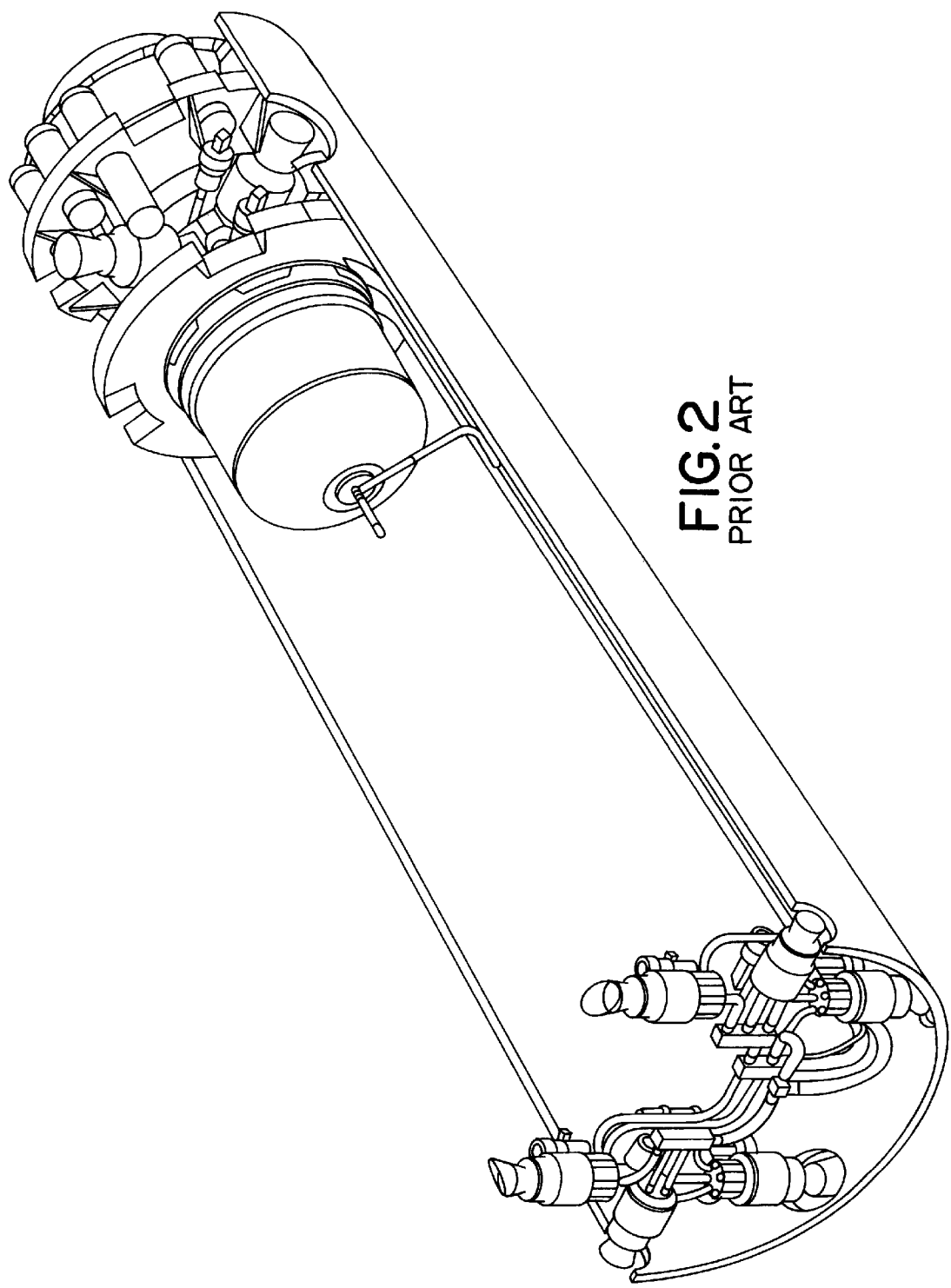
FIG. 2 is a layout diagram of a known divert propulsion system illustrated in FIG. 1.
Figure 3:
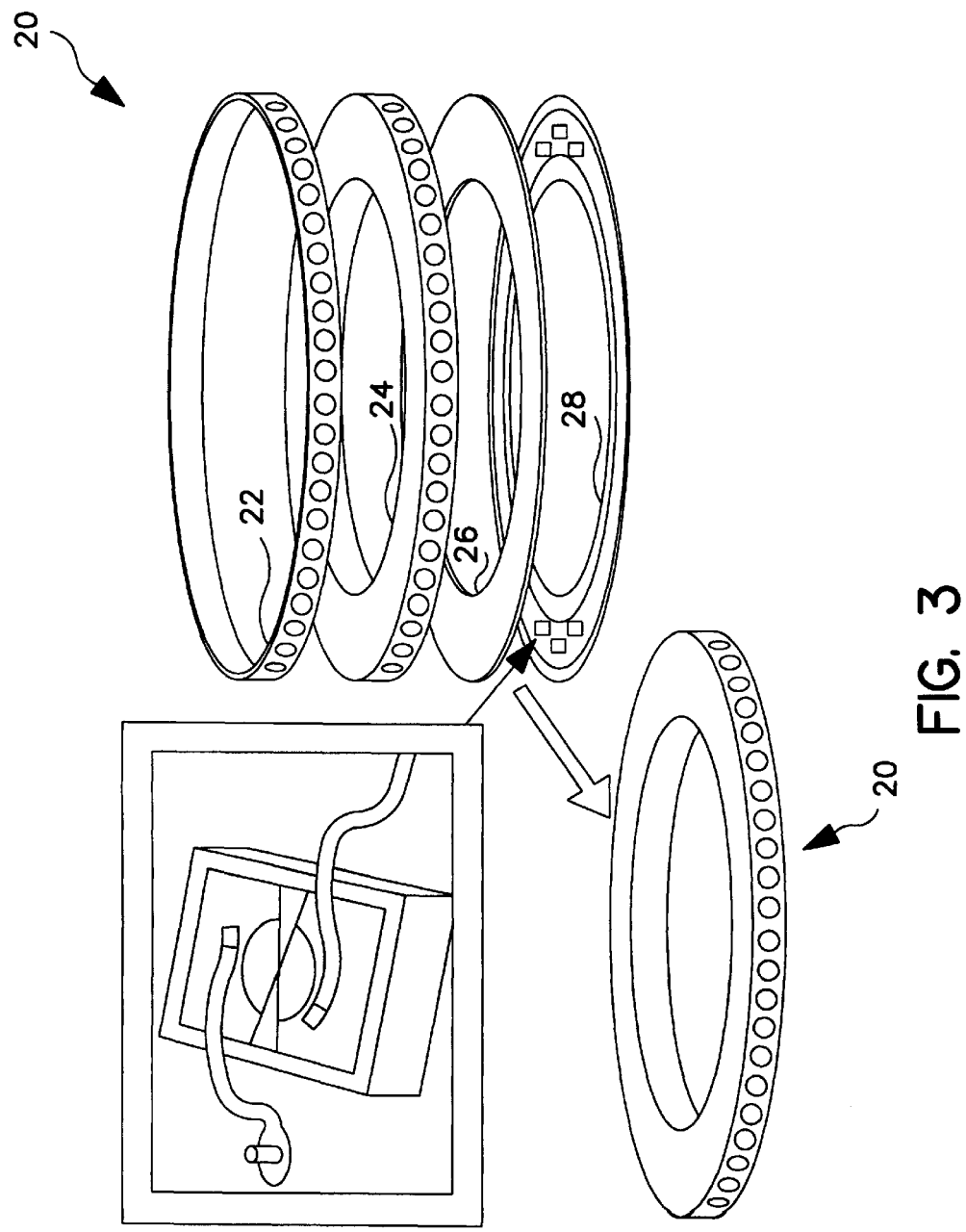
FIG. 3 is an exploded perspective view of the synthesized divert propulsion system illustrated in accordance with the present invention.
Figure 4:
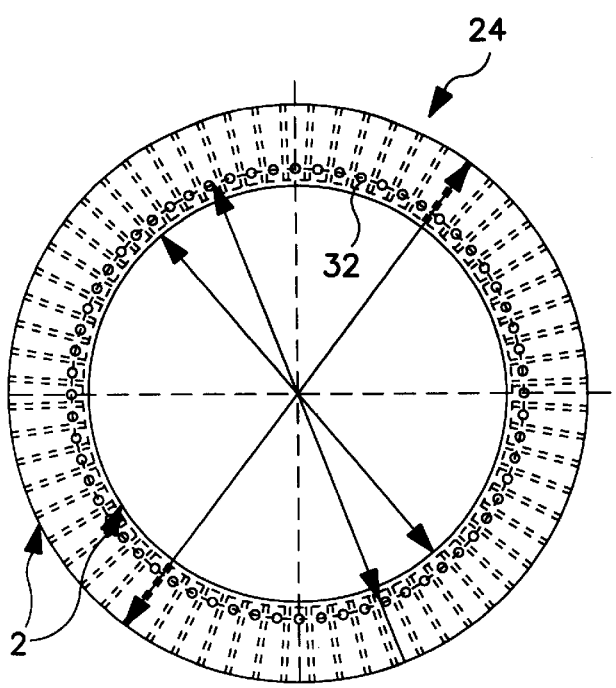
FIG. 4 is a plan view of a thruster wafer in accordance with the present invention.
Figure 5:
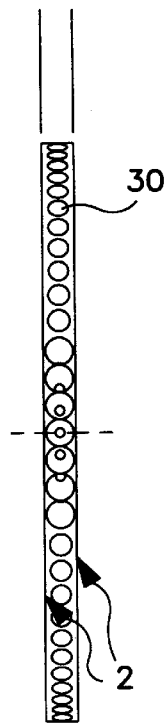
FIG. 5 is an end-view of the thruster wafer illustrated in FIG. 4.

Referring to the drawings and in particular FIG. 3, the synthesized divert propulsion system in accordance with the present invention is generally identified with the reference numeral 20. The synthesized divert propulsion system 20 is adapted to be utilized in various vehicles, including kill vehicles, interceptors, rockets, missiles and the like. The system 20 includes a thruster nozzle ring 22, a thrust chamber wafer 24, a charge cup wafer 26 and an electronics wafer 28. The thruster nozzle ring 22, thrust chamber wafer 24, charge cup wafer 26 and the electronics wafer 28 are stacked together concentrically and bonded together, for example, by anodic or polymeric bonding to form a synthesized divert propulsion system 20 as shown.

Figure 6:
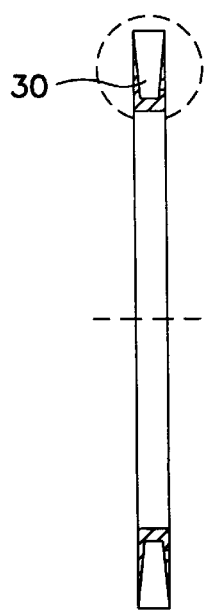
FIG. 6 is a sectional view along line A—A of FIG. 4.
Figure 7:
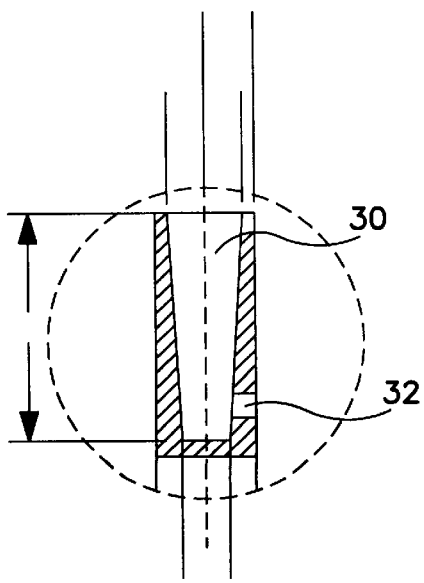
FIG. 7 is a partial sectional view illustrating a thrust chamber formed in the thruster wafer illustrated in FIG. 4.

An exemplary thrust chamber wafer 24 is illustrated in FIGS. 4–7. As shown, the thrust chamber wafer 24 is illustrated with an exemplary number of 64 thrusters. As shown in FIGS. 4–7, the thrust chamber wafer 24 is formed from high strength, low density metal, such as aluminum or titanium, plastic, silicon or ceramic material into a ring with a plurality of evenly spaced thruster chambers 30, for example, generally conically shaped thruster chambers, radially disposed adjacent the outside diameter of the thrust chamber wafer 24. Each thruster chamber 30 is adapted to carry a pyrotechnic powder, liquid or gelled liquid propellant (not shown). As best shown in FIG. 6, a pilot hole 32 is provided in each of the thruster chambers 30. The pilot holes 32 are used for enabling detonation of the propellant within the thruster chambers 30.

The thruster nozzle ring 22 (FIG. 3) is formed as a ring with a slightly larger outer diameter than the thrust chamber wafer 24 and is adapted to fit over the thrust chamber wafer 24. As best shown in FIGS. 9–12, the thruster nozzle ring 22 is formed with a plurality of radially disposed equally spaced nozzles 33, for example, formed in a generally conical shape, configured to correspond with the thruster chambers 30. As shown best in FIG. 12, conical shaped nozzles are provided. However, the principles of the present invention are also applicable to other nozzle shapes. The nozzle ring 20 also includes an aluminum seal which forms a burst disc for each thruster chamber 30. The thruster nozzle ring may be formed from high strength, low density metal, such as aluminum or titanium, plastic, silicon, or ceramic, and is adapted to be shrink fit over the thrust chamber wafer 24 forming a supersonic nozzle and a burst disc for each thrust chamber 30.

Figure 13:
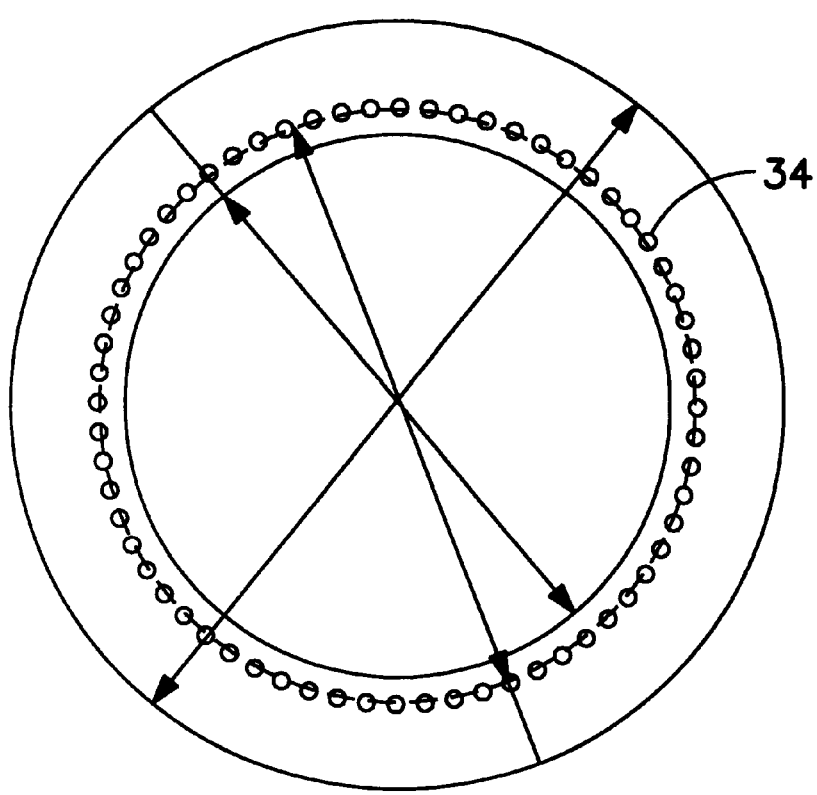
FIG. 13 is a plan view of a charge up wafer in accordance with the present invention.
Figure 14:
FIG. 14 is an end view of the charge cup wafer illustrated in FIG. 13.

A charge cup wafer 26 is secured to the thrust chamber wafer 24, for example by bonding. The charge cup wafer 26 may be formed from high strength, low density metal, such as aluminum or titanium, silicon or ceramic. As best shown in FIGS. 13 and 14, the charge cup wafer 26 includes a plurality of radially disposed cylinders 34 for holding a pyrotechnic initiation propellant (not shown). The charge cup wafer 26 is configured such that the cylinders 34 are configured to correspond to the thruster chambers 30 on the thrust chamber wafer 24. As shown in FIGS. 13 and 14 the charge cup wafer 26 is configured such that the individual cylinders 34 are in communication with the pilot holes 32 in the thrust chambers 30 and 24. The cylinders 34 with the pyrotechnic initiation propellant are used to ignite the propellant in the thrust chamber 30 formed on the thrust chamber wafer 24. The pyrotechnic initiation propellant is detonated by an electronic control circuit which is part of the electronics wafer 28 discussed below.

Figure 8A:
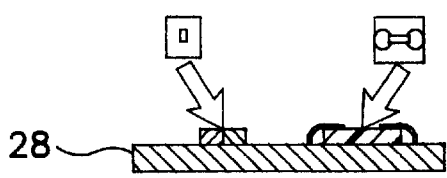
FIG. 8 and FIG. 8A illustrate and various methods for forming an electronics wafer in accordance with the present invention.
Figure 8:
Figure 9:
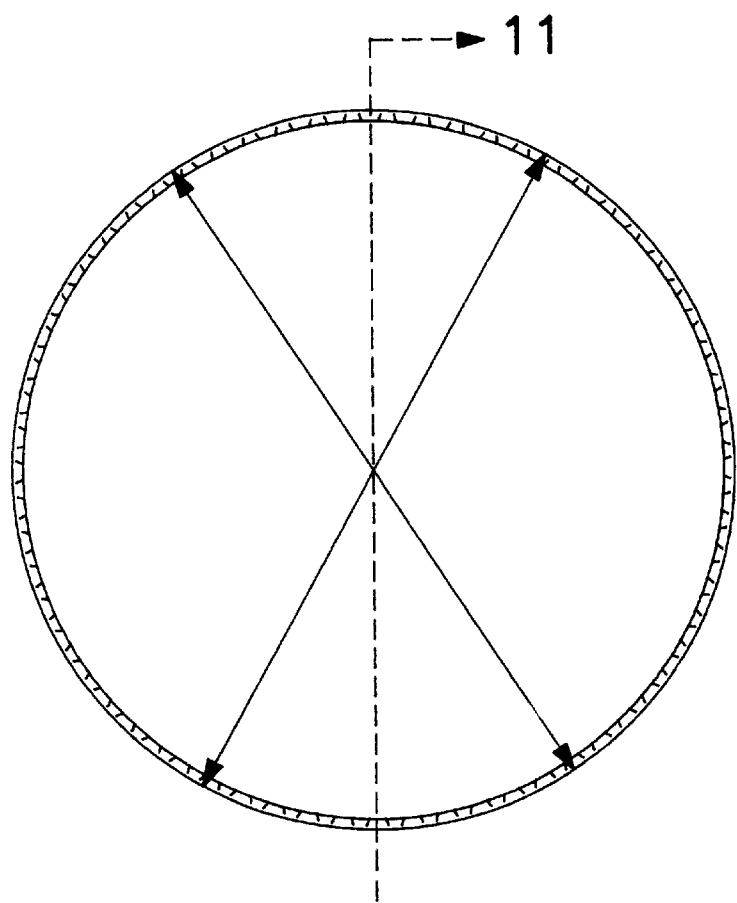
FIG. 9 is a plan view of a thruster nozzle ring in accordance with the present invention.
Figure 10:
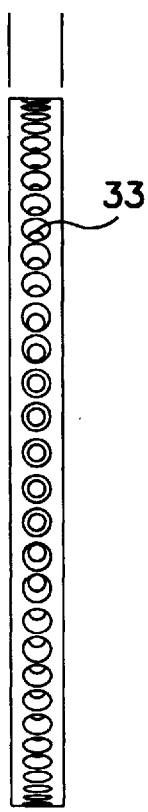
FIG. 10 is an end view of the thruster nozzle ring illustrated in FIG. 9.
Figure 11:
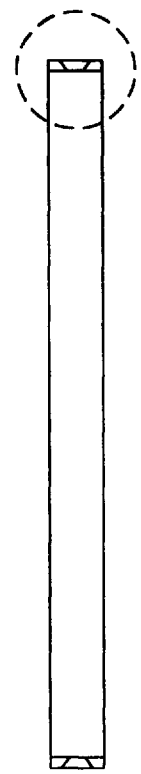
FIG. 11 is a sectional view of the thruster nozzle ring along line A—A of FIG. 10.
Figure 12:
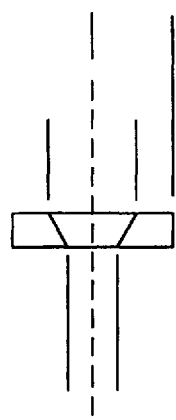
FIG. 12 is a partial sectional view illustrating a nozzle formed in the thruster nozzle ring in accordance with the present invention.
Figure 15:
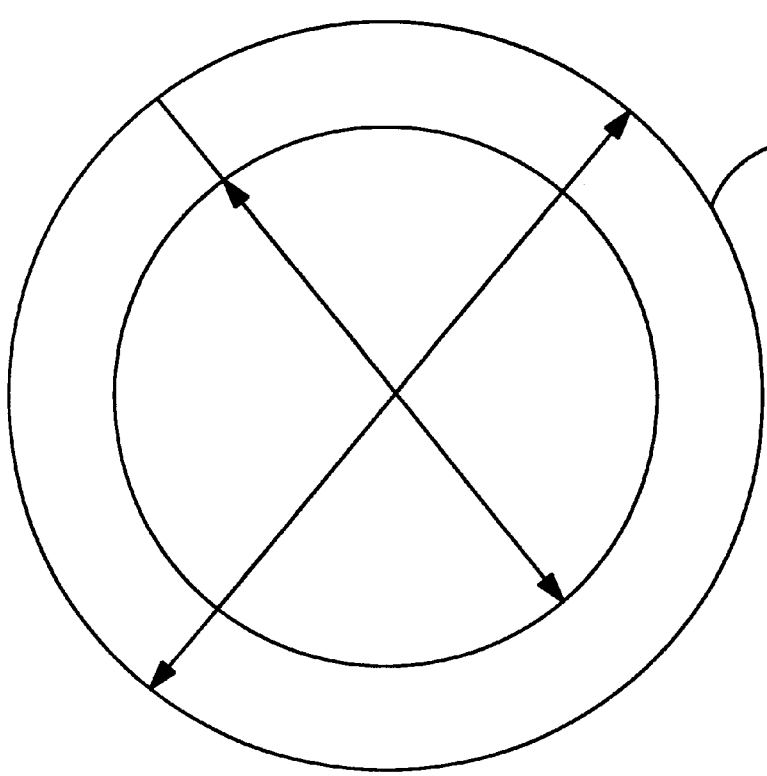
FIG. 15 is a plan view of an electronics wafer in accordance with the present invention.
Figure 16:
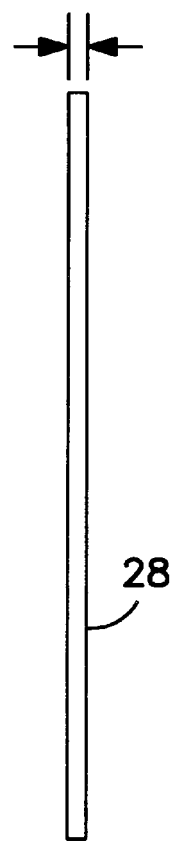
FIG. 16 is an end view of the electronics wafer illustrated in FIG. 15.

An exemplary electronics wafer 28 is illustrated in FIGS. 15 and 16. As will be discussed in more detail below, the electronics wafer 28 may include the timing, bookkeeping and control digital electronics as well as an analog firing circuit including semi-conductor bridge wire initiators and sensors for detonation of the thruster chambers and the thrust chamber wafer 24. As shown in FIG. 8, the electronics wafer 28 may be formed by hybrid multi-chip module (MCM) processing or by wafer scale integration (WSI). In monolithic WSI processing, a complete electronic system is fabricated as a single large circuit die. With WSI processing, all integrated circuits and components produced are generated by a single process. Thus, with WSI any defect in a wafer requires the entire wafer to be scrapped or built in functional redundancy to be utilized. An MCM module achieves many of the same benefits of the WSI module by combining many integrated circuits onto a common host substrate. The advantages of MCM over WSI processing includes the ability to use dies produced from a variety of methods most amenable to the dies function and the ability to screen individual dies for defects. MCM substrate types include ceramic, silicon or laminates, all of which have distinct characteristics and advantages.

The electronics wafer 28 contains all the digital processing and analog power and firing circuitry including low power semi-conductor bridewire (SCB) initiators used as thruster initiators for detonating the pyrotechnic initiation propellant contained in the charge cup wafer cylinders 34. The SCB initiator action times are relatively repeatable and require, for example, only 300 microjoules of electrical energy for initiation resulting in relatively small battery sizes. Digital signal processing may be implemented utilizing in-circuit programmable field programmable gate arrays (FPGA) chips, which allow for onboard programming and reprogramming of digital functions eliminating significant costs and schedule impact for chip foundry fabrication and refabrication when changes are made.

Figure 17:
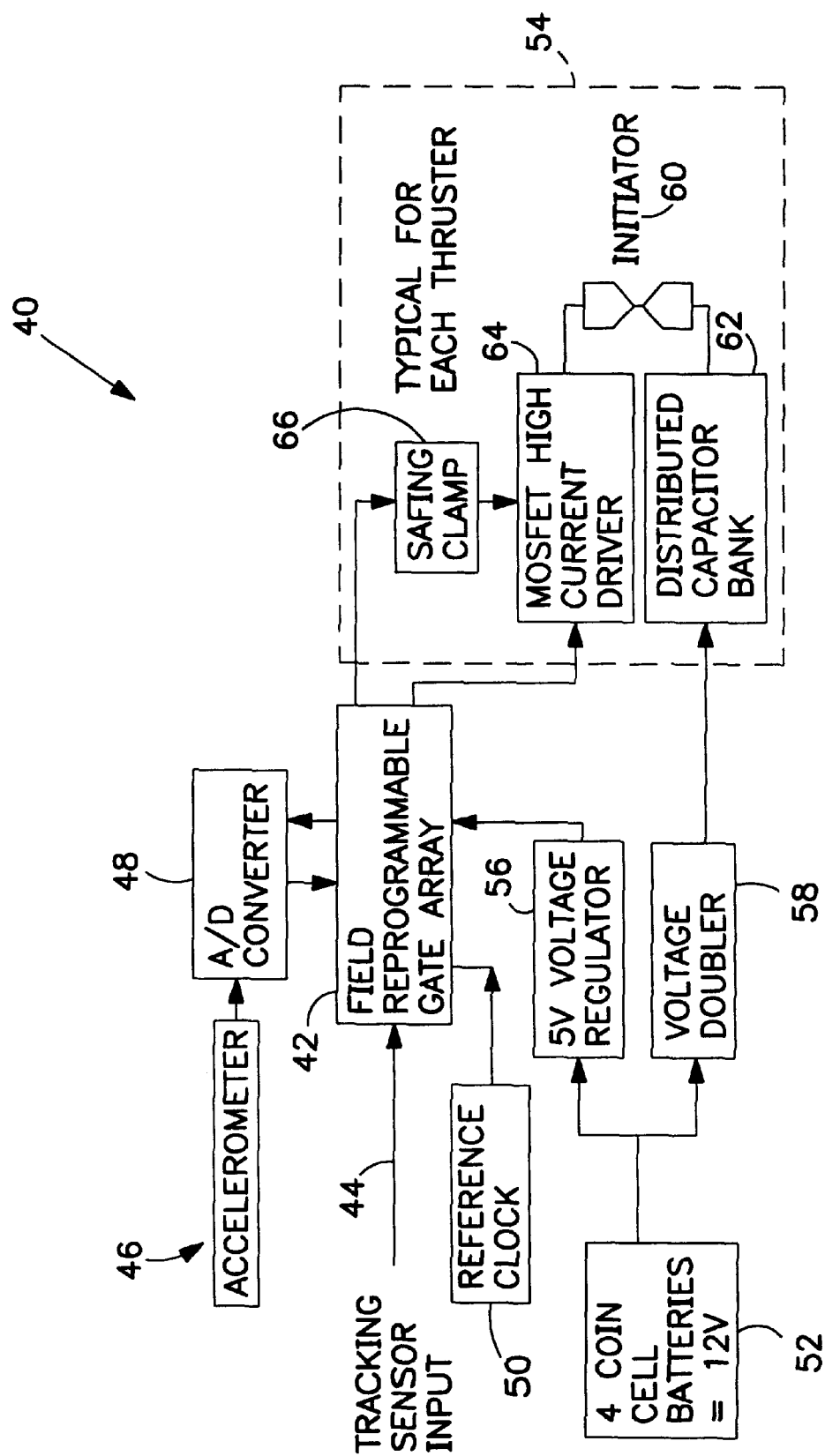
FIG. 17 is an exemplary block diagram of an exemplary thruster control system in accordance with the present invention.

A block diagram of the thruster control circuit 40 is integrated onto the electronics wafer 28 as illustrated in FIG. 17. Control of the thruster firing to divert a vehicle assumes that the vehicle is spinning around the thruster ring axis to permit each thruster to reach the firing angle at a time related to the spin rate. The control logic 40 may be embedded in a field programmable gate array (FPGA) 42 and use the timing and distance-off-center information from a conventional tracking sensor 44 to determine when during the vehicle rotation a thruster must fire to bring the vehicle axis in line with the target. The rotation timing can be determined by counting sensor timing pulses or by converting accelerometer data 46 into digital format using an analog to digital converter 48, with a digital phase locked oscillator (not shown) in the FPGA. A high frequency reference clock 50 may be used to synthesize a rotationally synchronized clock for accurate timing measurements. A small memory in the FPGA 42 may be used to keep track of the thrusters fired so that the control logic 40 ensures that they are fired on alternate sides of the vehicle so as to maintain balance. The initiators are preferably ignited in a relatively balanced manner to achieve a divert thrust. The distance-off-axis information from the sensor 44 may be used to determine how long to wait before firing the next thruster. The more off axis the target is, the sooner the next firing would have to be. The FPGA 42 may be used to provide all of the fire control and safing functions and would therefore require many I/O connections. Multiple FPGAs 42 could be also used and if used in pairs would aid in balancing the vehicle.

The power source for the system may be part of the vehicle or be located on a MEMS substrate in the form of coin cell batteries 52 in series. The batteries 52 must produce low voltage for the logic (typically 5 V or 3.3 V) and higher voltages on the order of 15 to 20 volts for rapid firing of the initiators 54. A low voltage regulator 56, which may consist of a single chip, can be used to provide conditioned power for the logic and control circuitry 40. To avoid the added weight and volume of many coin cells in series, a simple charge pumped voltage doubler circuit 58 may be used to increase the battery voltage to the level needed for the initiators 60, which require a high voltage and high current (4 to 6 amps) to fire rapidly enough to make timing practical. Since small batteries do not produce currents this high, it is necessary to accumulate the energy over a longer time in a capacitor bank 62 so that higher currents of much shorter duration can be produced. The capacitor bank 62 must be sized so that the voltage across the initiator 60 not droop by more than 30% while the initiator is burning open. This necessitates that the capacitor bank 10 store at least 10 times as much energy as a single initiator needs to open. Assuming an initiator requires 300 microjoules of energy, the estimated amount of capacitance needed to produce the higher currents would need to be at least 15 microfarads—a sizeable capacitor. Since only one initiator 60 is fired at a time, a shared capacitor bank 62 made up of many smaller capacitors in parallel and connected with a high current trace would permit the use of much smaller capacitors distributed evenly around the MEMS substrate.

The actual firing of the initiators 60 may be accomplished by using a high current metal oxide semiconductor field effect transistor (MOSFET) transistor, silicon controlled rectifier (SCR), or bipolar transistor 64. SCRs and bipolar transistors require additional circuitry and higher trigger energies to turn them on. High current, low on-resistance MOSFETs 64 are available that require no additional circuitry other than a logic level to turn them on. Each initiator 60 would preferably have a dedicated MOSFET high current driver 64 to fire it, which would, in turn, be controlled directly from the FPGA output. In addition, a depletion mode field effect transistor (FET) with a separate control circuit may be used as a safing clamp 66 to prevent accidental turn on of the MOSFET driver 64. A depletion mode FET transistor is normally on until a pinch-off voltage turns it off. The FET transistor is connected across the gate-source connection on the MOSFET, effectively shorting out any noise pulse that might turn on the MOSFET earlier than desired. The FPGA 42 is used to signal the safing clamp 66 to release the gate of the MOSFET just before the firing pulse would be sent to the MOSFET.

As mentioned above, the various wafers 22, 24, 26 and 28 are amendable to being fabricated using microelectromechanical system (MEMS) technology. Each wafer 22, 24, 26, and 28 is fabricated utilizing processes which provide the lowest cost and highest operational performance. As discussed above, the electronics wafer 28 may be fabricated in one of two ways utilizing either a multi-chip module (MCM) approach or wafer scale integration (WSI) approach. MCM requires fabrication of individual chips such as accelerometers, IMUs, FPGAs and SCBs from several different wafers utilizing a variety of electronics process technologies. These chips are then bonded onto a common host substrate which can include ceramic, silicon, or laminates. The substrate is metallized with current carrying paths and the chips are wire bonded to these paths to complete the circuit. The substrate is formed using hot pressing techniques and is machined using diamond tool machining processes, ultrasonic processes, water jet cutting and laser cutting. The individual chips are fabricated using traditional chip manufacturing processes such as MOS (metal oxide semiconductor), CMOS (complimentary metal oxide semiconductor), SOS (silicon on sapphire), and POLY (polysilicon on silicon).

WSI requires fabrication of a complete functional electronics system on a single large integrated circuit die. By definition, monolithic WSI has all components such as accelerometers, IMUs, FPGAs and SCBs fabricated using the same process which include MOS, CMOS, SOS or POLY.

The charge cup wafer 26 and thruster wafer 24 can be fabricated from lightweight metals, composites, plastics or silicon. Each of these materials has advantages and tradeoffs in relation to cost, manufacturability, weight and volume. These materials are machined using traditional manufacturing methods and, in the case of silicon, using electronic manufacturing methods.

The individual wafers are then bonded together using epoxies or anodic bonding techniques.

Obviously, many modifications and variations of the present invention are possible in light of the above teachings. Thus, it is to be understood that, within the scope of the appended claims, the invention may be practiced otherwise than as specifically described above.

We claim:

1. A synthesized divert propulsion system for use in a vehicle, the propulsion system comprising:

a thrust chamber wafer formed as a ring with a plurality of thrust chambers for carrying a pyrotechnic propellant;

a thruster nozzle ring formed with a plurality of nozzles corresponding to said thrust chambers, said thruster nozzle ring including a seal for closing said nozzles forming a burst disc for each thrust chamber; said thruster nozzle ring adapted to be mounted concentrically relative to said thrust chamber;

a charge cup wafer formed as a ring with a plurality of chambers for carrying an initiator pyrotechnic for detonating said thrust chambers;

an electronics wafer having a plurality of igniters for igniting said initiator pyrotechnic propellant in said charge cup wafer, said electronics wafer having a thruster control circuit bar igniting a plurality of initiators in a balanced manner to achieve a divert thrust.

2. The synthesized divert propulsion system as recited in claim 1 wherein said thrust chambers are radially disposed about said thrust chamber wafer.

3. The synthesized divert propulsion system as recited in claim 2 wherein said thrust chambers are formed in a generally conical shape.

4. The synthesized divert propulsion system as recited in claim 1, wherein said thrust chamber is formed from a low density, high strength metal.

5. The synthesized divert propulsion system as recited in claim 1 wherein said thrust chamber is formed from silicon.

6. The synthesized divert propulsion system as recited in claim 1, wherein said thrust chamber is formed from ceramic.

7. The synthesized divert propulsion system as recited in claim 1, wherein said thrust chamber is formed by microelectromechanical system (MEMS) technology.

8. The synthesized divert propulsion system as recited in claim 1, wherein said thruster nozzle ring is formed with a slightly larger diameter than said thrust chamber wafer.

9. The synthesized divert propulsion system as recited in claim 1, wherein said thruster nozzle ring is formed with a plurality of nozzles adapted to be aligned with said nozzles in said thrust chamber wafer.

10. The synthesized divert propulsion system as recited in claim 1, wherein said thruster nozzle ring is formed from a low density, high strength metal.

11. The synthesized divert propulsion system as recited in claim 1, wherein said thruster nozzle ring is formed from a low density, high strength silicon.

12. The synthesized divert propulsion system as recited in claim 1, wherein said thruster nozzle ring is formed from a low density, high strength ceramic.

13. The synthesized divert propulsion system as recited in claim 1, wherein said seal is formed from a metal.

14. The synthesized divert propulsion system as recited in claim 13, wherein said metal is aluminum.

15. The synthesized divert propulsion system as recited in claim 1, wherein said thrust chambers in said thruster nozzle ring are formed with a generally conical shape, each forming a supersonic nozzle.

16. The synthesized divert propulsion system as recited in claim 1, wherein said thruster nozzle ring chambers are radially disposed relative to said thruster nozzle ring.

17. The synthesized divert propulsion system as recited in claim 1, wherein said thruster nozzle ring is formed by MEMS processing.

18. The synthesized divert propulsion system as recited in claim 1, wherein said chambers in said charge cup wafer are radially disposed.

19. The synthesized divert propulsion system as recited in claim 1, wherein said charge cup chambers have a generally cylinderical shape.

20. The synthesizied divert propulsion system as recited in claim 1, wherein said charge cup wafer is formed from a high strength, low density metal.

21. The synthesized divert propulsion system as recited in claim 1, wherein said charge cup wafer is formed from silicon.

22. The synthesized divert propulsion system as recited in claim 1, wherein said charge cup wafer is formed from ceramic.

23. The synthesized divert propulsion system as recited in claim 1, wherein said charge cup wafer is formed by MEMS processing.

24. The synthesized divert propulsion system as recited in claim 1, wherein said electronics wafer is formed by a multi-chip module (MCM) processing.

25. The synthesized divert propulsion system as recited in claim 1, wherein said electronics wafer is formed by wafer scale integration (WSI).

26. A method for making a divert propulsion system comprising the steps of:
   a) making a thrust chamber wafer;
   b) making a thruster nozzle ring;
   c) making a charge cup wafer;
   d) making an electronics wafer; and
   e) assembling and bonding said wafers together.

27. The method as recited in claim 26, wherein said wafers are bonded together with epoxy.

28. The method as recited in claim 26, wherein said wafers are bonded by anodec bonding.

29. The method as recited in claim 26, wherein said wafers are bonded by polymeric bonding.

30. The method as recited in claim 26, wherein one or more of said wafers are formed by MCM processing.

* * * * *